May 28, 1935.　　　　N. B. LUND　　　　2,003,261
THICKENER
Original Filed Feb. 16, 1931　　5 Sheets-Sheet 1

Inventor
NELS B. LUND,
By Arthur Middleton
Attorney

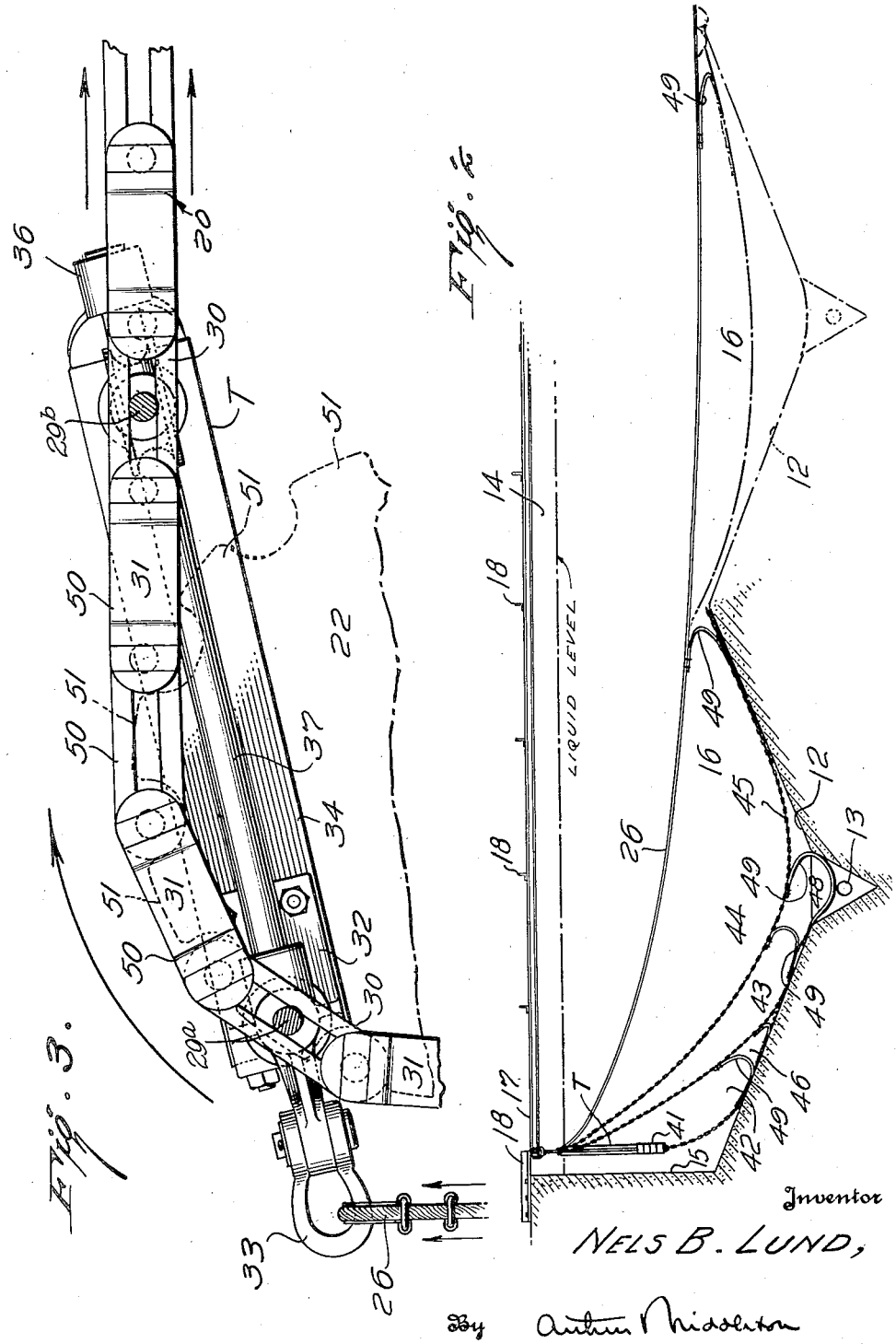

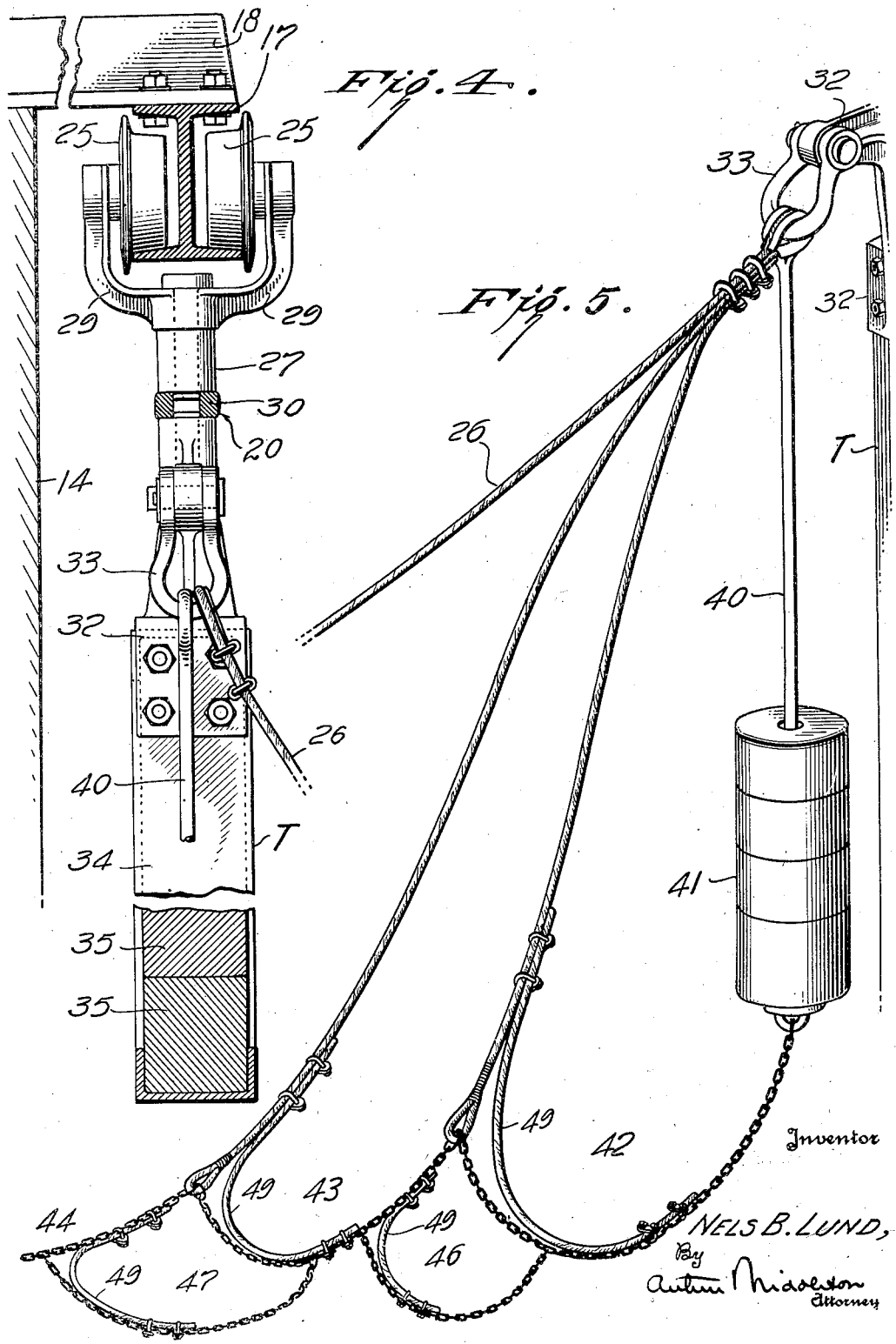

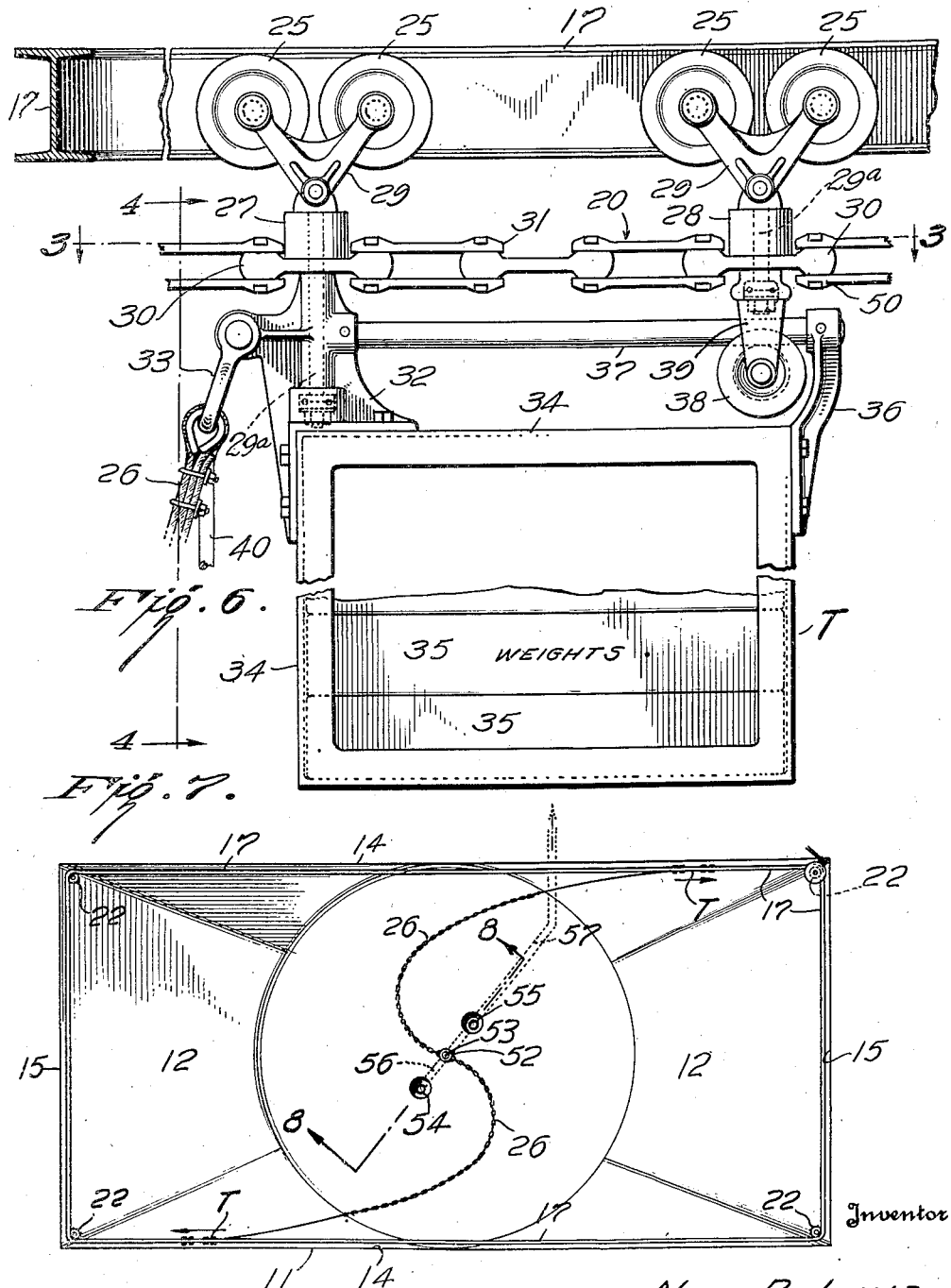

May 28, 1935.   N. B. LUND   2,003,261
THICKENER
Original Filed Feb. 16, 1931   5 Sheets-Sheet 5
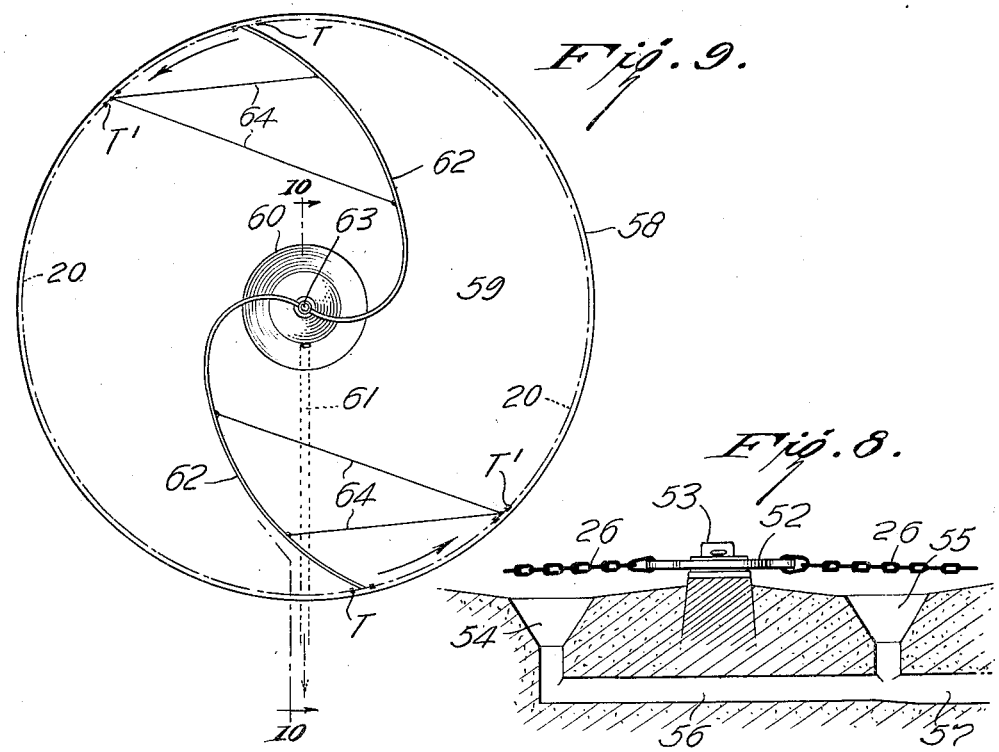
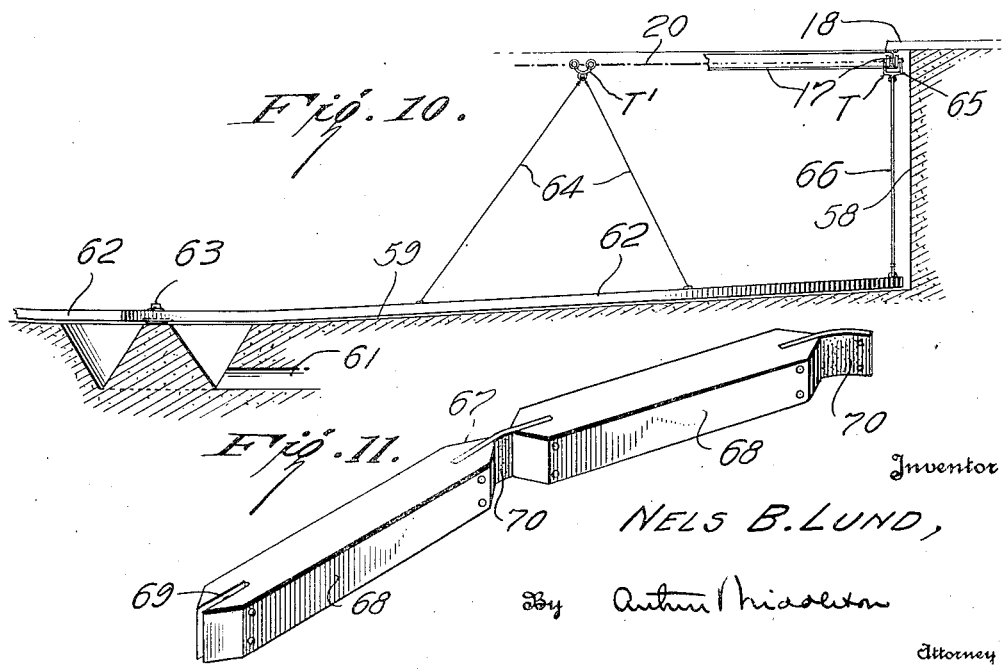
Inventor
NELS B. LUND,
By Arthur Middleton
Attorney Patented May 28, 1935

2,003,261

UNITED STATES PATENT OFFICE 2,003,261

THICKENER

Nels B. Lund, Seaford, N. Y., assignor, by mesne assignments, to The Dorr Company, Inc., New York, N. Y., a corporation of Delaware Application February 16, 1931, Serial No. 515,917
Renewed November 15, 1934

26 Claims. (Cl. 210—55)

This invention relates to means for conveying settled sludge to a point of removal in sedimentation apparatus such as thickeners, clarifiers and sewage digesters.

One object is to provide improvements in the manner of moving sludge removing means in the tank.

Other objects of the invention are to provide a more flexible medium for collecting and conveying the settled sludge in any such device along the bottom of a sedimentation chamber to its discharge outlet; to provide a sludge conveying or dragging mechanism which can be motivated from the boundaries of the sedimentation chamber; to provide such a mechanism which will require a minimum of propelling power; and to provide such a mechanism which is capable of use in sedimentation chambers of any shape or contour, either round, rectangular or irregular.

The invention provides a novel arrangement of elements in cooperative relationship, one main element of which is disposed to extend adjacent to and along the boundary wall of the tank, and which main element has a novel association with the tank and the other elements of the arrangement, this main element being instrumental in effecting movement of the sludge removing means in the tank to various positions therein.

An essential feature of the invention consists in moving a guided carrier and its associated sludge removing means by having a motor or the like coacting through suitable power transmission means with a flexible element which flexible element is disposed to extend adjacent to and along the boundary walls of the tank, preferably adjacent the upper portion thereof.

General description

The invention contemplates apparatus for scraping or dragging sludge over the bottom of a sedimentation chamber or tank to a point or points of removal comprising flexible sludge dragging or conveying means whereby the entire bottom of the tank is swept by the sludge conveying means, and a flexible connection between the conveying means and a propelling device located and travelling above the liquid level of the tank.

The invention also contemplates an arrangement of counteracting by counterweights the pull of the flexible connection to the sludge conveying means upon the travelling propelling device.

The invention further contemplates—off-center locations of sludge discharge as being more appropriate and efficient for use with a flexible sludge collecting means. Also the invention includes the devising of sludge conveyor motivating element adapted to travel upon a cable or railway supported adjacent to the peripheral or boundary wall of the tank.

The invention also contemplates a combination of rigid sludge raking arms and flexible extensions thereof for aiding in their sludge scraping and in their propulsion.

The invention may find embodiment in a variety of forms but for the purpose of making the invention clearly understood I have illustrated certain forms of it in the accompanying drawings in which Figure 1 shows a plan view of my invention applied to a rectangular sedimentation tank having irregular bottom. Figure 2 shows a section view taken along the line 2—2 in Figure 1. Figure 3 shows a detail of construction.

Figure 4 is a vertical transverse sectional view taken along the line 4—4 in Figure 6. Figure 5 shows by perspective how the cables are secured to one of the travellers. Figure 6 is a side elevation of a traveller with parts in section.

Figure 7 shows the invention applied to a different form of tank. Figure 8 shows a detail of construction. Figure 9 shows the invention applied to a round tank while Figures 10 and 11 show other details of construction.

Detailed description

Figure 1:
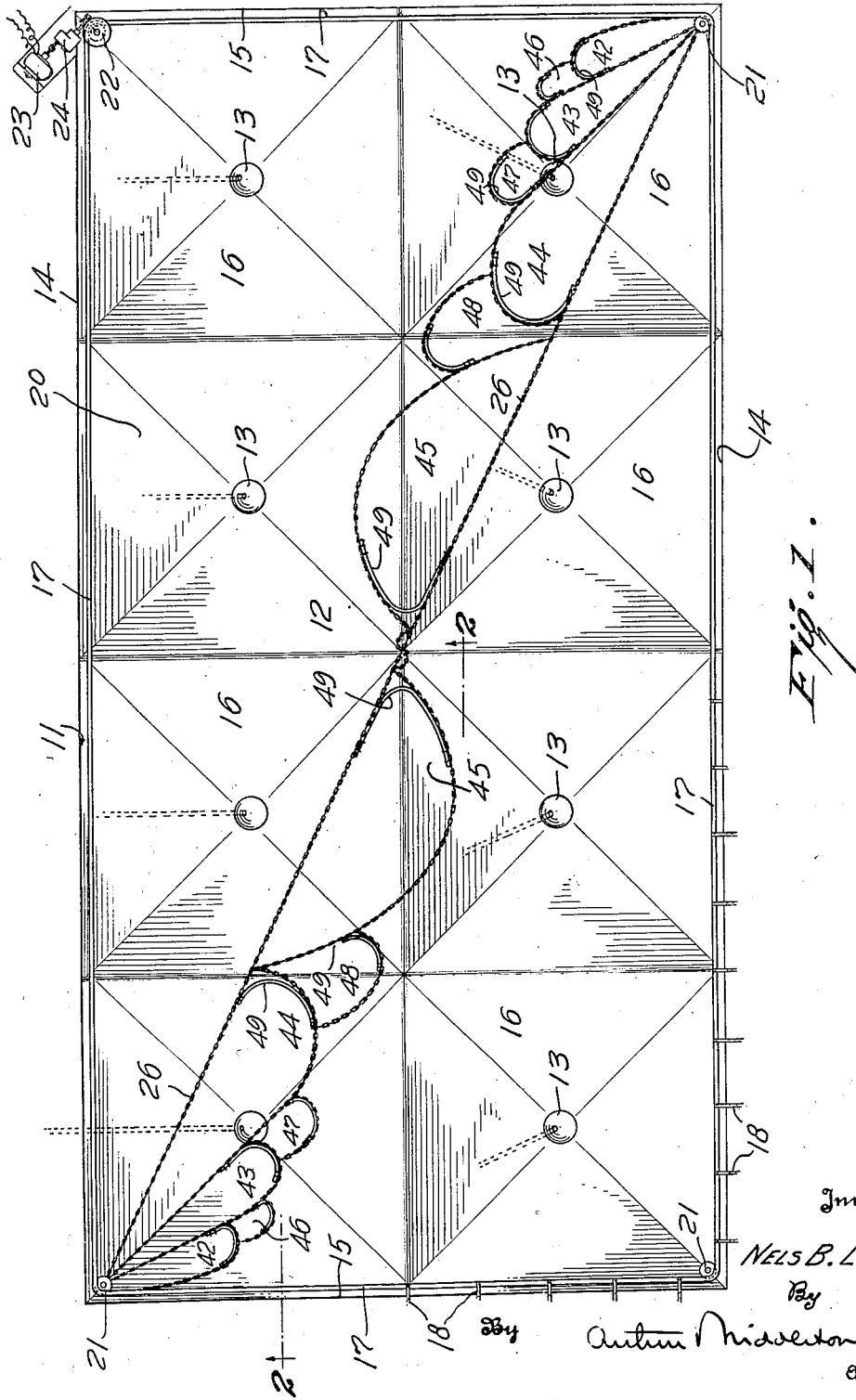

The numeral 11 represents a rectangular type of thickener or sedimentation tank in which solids are to be settled from suspension in liquids in the form of sludge, and the sludge is to be collected and conveyed from the bottom 12 of the tank to a point of sludge discharge such as 13. 14 indicates the side walls of the tank, 15 the end walls. In Figure 1 and 2 the bottom 12 is shown to have the form of a plurality of hoppers 16 because this is the most difficult type of bottom to clean and it can be seen from this illustration how readily the devices of this invention lend themselves to cleaning tanks having irregular bottoms.

The bottom scraping or sludge conveying means must be transported or dragged over the bottom 12 so the motivating devices for that purpose include a preferably continuous rail-way or cable way 17 suitably supported from the walls of the tank by such means as brackets 18. Upon the rail 17, there is adapted to, and supported for movement thereon a traveller T motivated by some flexible means such as a chain 20 maintained in movable association with the rail 17 by suitable means of the nature of idler pulleys 21 or roller banks, around which the chain 20 passes. The traveller T in the specific form disclosed may also be said to function in the way of a trolley arrangement or vehicle moving along a track.

The chain 20 is propelled by means of a sprocket or other suitable gripping rotatable device 22 which is driven by means of a prime mover and appropriate gearing 24. The chain 20 is fastened to the traveller T so that movement of the chain 20 around the tank pulls the traveller around with it since the traveller T is supported for rolling engagement with the rail 17 by means of rollers 25.

There are a plurality of travellers, such as a pair arranged directly opposite each other, that is located 180° apart. Attached to these two travellers or carriers is a flexible connection such as a cable 26 to which are secured or from which depend the various sludge collecting or dragging means hereinafter described. Therefore, as the pair of travellers are propelled around the tank in their fixed spaced relation, they carry with them the cable 26 and its dependent sludge conveyors or drags.

Referring in more detail to the travellers T which are alike in form so only one need be described. Each consists essentially of a weighted frame pivotally depending from two traveller bodies linked together. Each traveller body is supported from two pairs of rollers engaging rail 17.

In Figures 4 and 6 it can be seen that each traveller is composed of two body portions 27 and 28 on the upper part of each of which is carried by swivel connection yokes 29 comprising bolts or suspension members 29a and 29b respectively depending from two pairs of rollers 25 which engage and roll upon the rail 17. Below the body portions 27 and 28 is pivoted thereon a link 30. The adjacent ends of these links 30 are pivotally connected by draw bar 31 and the non-adjacent ends of links 30 have pivotally secured thereto the propelling flexible cable or chain 20.

Traveller body 27 has pivotally depending from it a bracket 32 provided with a clevis 33, and secured to the bracket is a frame 34 adapted to carry weights 35 of variable amounts. Assisting in the support of the frame 34 is another bracket 36 having a shaft 37 extending from it to bracket 32. The shaft 37 is supported also by means of a roller 38 journalled in a pivoted yoke 39 pivotally depending from traveller body 28. This arrangement is to permit relative movement between the traveller bodies 27 and 28 in going around the corners of the tank. When making the turn, the traveller body 28 moves toward the traveller body 27 and then returns to its normal position as the traveller reaches the straight portions of the tank.

From clevis 33 on bracket 32 depends a rod 40 adapted to have applied thereto weights 41 in varying amounts. The clevises 33 likewise have secured thereto the main sludge conveyor supporting cable 26, so that movement of the travellers in their spaced relation drags the cable 26 over the bottom of the tank.

The sludge conveying means or drags comprise flexible loops of cable, chain or perhaps an articulated member or a combination thereof, and these loops depend from the main supporting cable 26 in such a manner as to sweep the entire bottom of the tank.

The main supporting cable 26 for the sludge dragging means has to be fastened to the travellers T in a plane well above the bottom of the tank for otherwise the pull of the cable 26 laterally upon the travellers will swing them out of the perpendicular. Therefore, the cable 26 is fastened to clevises 33 as shown in Figures 4 to 6. Their pull on the clevises and travellers is off-set by means of the counterbalancing weights 41 in order to keep down, as much as possible, any tendency toward lateral movement upon the travellers.

However, the cable 26 thus meets the travellers at such an angle that it will not reach into or sweep from the vertical corners of the tank. So, flexible loops are necessary to fill in the gaps so to speak, left between the main cable 26 and certain parts of the tank bottom. 42, 43, 44 and 45 represent such principal loops counting from the travellers T, while 46, 47 and 48 represent secondary loops depending from adjacent principal loops and arranged as shown in Figures 1, 2 and 5.

Each loop is best comprised of a chain as shown and preferably reinforced or rather stiffened by a length of wire rope or cable 49 for the purpose of keeping each loop from getting tangled up with others and for maintaining each loop open or expanded and against any collapse. When maintained in expanded position each loop more readily collects sludge as it is dragged over the tank bottom. From Figure 2 it can be seen how this arrangement of principal and secondary loops depending from the main supporting cable 26, sweeps the entire area of the tank bottom.

There remains now to describe the traveller propelling mechanism. This consists of a flexible linear element such as a cable but preferably a chain 20 which pulls the traveller along while it depends from the rail-way 17. This chain 20 is hung in any suitable way from the rail 17, and it takes around the idler pulleys 21 as previously described. The chain 20 receives its propulsion by means of its links 50 engaging teeth 51 on sprocket 22 so that it is driven by rotation of the sprocket.

When a traveller T encounters a corner of the tank, the various co-acting elements take positions as indicated in Figure 3 the principal point of which is that in order to get around the corner, compensation must be made for the difference between the distance between the traveller rollers on the pitch line of the chain and the chordal dimension which varies as the traveller rounds the corners.

Modifications

In Figure 7, instead of hoppers in the bottom of the tank as at 16 in Figure 1, there may be a single zone of sludge outlet. In this form, the main sludge conveying or dragging cable or chain 26 has its middle portion localized with relation to the sludge outlet by a rotatable collar 52 supported upon a pin 53 upstanding from the tank bottom. Sludge discharge outlets 54 and 55 are provided which are located off-center in the tank bottom. They are connected by a conduit 56 and they both discharge sludge into a pipe 57 for conveying the sludge from the tank. It has been found that as the sludge dragging cables or chains take the curved form as shown in Figure 7, and as the most sludge is carried by the curved portion, to locate the sludge discharge openings 54 and 55 off-center and more nearly in the path of the curved portion of the cables 26, results in a most efficient discharge of the sludge.

Figure 9 shows diagrammatically this cable type of sludge conveying means applied to a round tank instead of a rectangular one. In this case, the tank 58 has a bottom 59 and a central bottom sludge discharge 60 with its outlet conduit 61.

Rail 17, travellers T and propelling chain 20 are the same as in the other modifications but I may use crawlers T and any other suitable motivating arrangement. However, instead of flexible sludge conveyors in this case I may use rigid sludge raking or scraping arms 62 of any kind, but preferably involute, supported from a vertical shaft 63 or otherwise journalled for rotation or for sweeping the tank bottom. Or the raking arms may be partly rigid and partly flexible.

Propulsion of the rakes or scrapers 62 is provided by a bridle 64 or other flexible means connecting the arms 62 to the travellers T. The outer ends of the arms 62 may also be supported from idling followers 65 travelling upon the rail 17 by means of a cable 66.

In Figure 11, a modified form of flexible or combination sludge scraping means 67 is shown which may be used as a substitute for the sludge dragging flexible means heretofore described, where the sludge to be scraped is of a character which requires larger vertical areas on the scraping means to contact with the sludge. In this case, I would use a scraper 67 made up of wooden or the like blocks 68, slotted at their ends as at 69. Flexible strips 70 connect the blocks 68 together in that each strip 70 enters and is fastened in abutting slots 69 of adjacent blocks 68.

Operation

The invention comprises means for conveying sludge settling on the bottom of a sedimentation tank for sewage or the like from the place where it settles on the bottom to the discharge outlet.

To that end, two or more oppositely positioned travellers or carriages T travel upon a railway 17 and are propelled by a chain 20 impelled by a driven sprocket 22 engaging the chain.

Fastened between the travellers T and extending across the tank is a main cable 26 from which depend flexible loops for sweeping all parts of the tank bottom as the main cable 26 is carried around by the travellers. The loops collect and convey or drag the sludge on the tank bottom to a point or zone of its discharge from the tank. The cable 26 and its loops are so fastened to the travellers and are so counterweighted that tendency to pull the travellers out of the vertical is overcome.

Stiffening means are provided for keeping the loops expanded so they will collect a maximum amount of sludge.

Where a tank has a substantially central sludge outlet, it has been shown herein that it may be desirable to have the outlet arranged off-center when curved sludge dragging means are used. It may also be of value to have a centralizing means or pin for the middle part of the sludge dragging cable to maintain the middle part of the cable in its most efficient relation to the sludge outlet.

Also, under certain circumstances it is advantageous to combine pivoted rigid sludge raking arms with a flexible connection to the travellers. And it is also desirable under certain conditions to have the sludge conveyor made up of alternate sections of rigid and flexible members.

Members such as 17 have heretofore been referred to in the specification as a continuous railway or cableway and it will be manifest that it may be properly referred to as a substantially endless track or rail that provides a closed or endless path or trackway upon which a wheeled element or member—sometimes referred to as a guided element or member and sometimes as a traveling member—is supported, and on or by which track or rail said traveling member is guided as it is caused to move along the same as the apparatus functions. The part of the means just referred to and which is sometimes identified in the specification as the traveler T constitutes or provides the wheeled member or guided element referred to, and this member or the operative association of such members may be broadly referred to as guided means or even as traveling means. This traveling means may be considered as constituting an essential part of a sludge collecting and conveying means of which the sludge scraping chains and associated parts constitute other essential elements.

The chains and associated parts which are provided for sweeping or scraping the bottom of the tank and for thereby collecting deposited sludge and for conveying the deposited sludge to a point or points of sludge discharge for the tank, to wit, to a point or points whereby the sludge passes from the tank through suitable discharge means leading from the bottom of the tank, constitutes what may be considered as a sludge collecting and conveying device. The traveler T or guided means provided thereby may be considered as being provided for and as having connection with the sludge collecting and conveying device whereby the associated traveling means and the sludge collecting and conveying device constitute the main parts of the sludge collecting and conveying means referred to.

This sludge collecting and conveying means is actuated through the mechanism that includes the motor and endless flexible chain and as the travelers or guided members are caused to move along the endless path there is a functioning of the sludge conveying and collecting device provided by the chains or other bottom sweeping elements to effect the required or desired sludge collecting from the several portions of the bottom of the tank and the conveying and ultimate delivery of the collected sludge from the tank through the discharge openings or means with which the tank is provided.

The chain 20 previously referred to as a flexible means that is maintained in movable association with the rail or track 17 is properly defined as an endless flexible member—in fact, as a circumferential endless member—that constitutes an essential element of a mechanism provided for insuring or effecting a moving of the traveling or guided means, to wit, the traveler or travelers T, along the closed path as provided or defined by said rail or track.

The parts previously referred to as the prime mover and associated gear 24 constitute an operating element which may be broadly referred to as a motivating element or as motive power means that is arranged to also constitute an essential element of the last-mentioned mechanism. The endless flexible chain and said motivating element are operatively arranged and assembled in respect to the rest of the structure with which they are associated whereby the flexible element or chain receives forces imparted thereto by the motivating element for thereby insuring a moving of said guided means along the closed path or track as said motivating element functions.

The endless or closed path for the guided means as provided by the continuous rail or track 17 is located at or adjacent the top portion of the liquid retaining peripheral wall structure which extends upwardly from the bottom of the tank or sedimentation basin and above the level of the liquid when undergoing sedimentation. The endless flexible element, to wit, the chain 20, is substantially co-extensive with the track 17 and the upper portion of the periphery or upper side walls of the tank. The chain 20 is preferably located above said liquid level or, as otherwise expressed, at or adjacent the top portion of the peripheral retaining walls and so that at least the major portion of the chain or flexible element is in substantially parallel relationship with respect to the rail or track.

The bringing together in a sedimentation tank and in assembled relationship (a) of a sludge collecting and conveying device, (b) of a guided or traveling element therefor provided as by a wheeled member, (c) of a track for the traveling element or wheeled member, (d) of an endless flexible element substantially paralleling said track, and (e) of a motive power means having associated therewith a driven element such as a sprocket or wheel that cooperatively engages successive portions of the endless chain in effecting movement of the traveling element along the endless pathway or track, is believed to be generically new and provides certain patentable aspects to which the claims hereof are directed.

The invention therefore is capable of a number of different embodiments and obviously its form and details can be changed without departing from the spirit thereof as described by the specification and claims.

I claim:—

1. In settling apparatus, a tank having a bottom for collecting settled sludge, sludge conveying means for sweeping the tank bottom comprising a sludge scraping device, a motivating element therefore travelling around the circumference of the tank, a circumferential rigid guide for said motivating element, a flexible connection for securing the sludge scraping device to said travelling motivating element at a point above the liquid level of the tank, and means operable upon the travelling motivating element for counterbalancing lateral pull thereon of the sludge scraping device, and means for moving the motivating element.

2. The apparatus of claim 1 in which the counterbalancing means comprise a weight carried by the travelling motivating element, and a connection between the weight and the motivating element, which provides leverage enabling the weight to counteract the lateral pull of the sludge scraping device.

3. The apparatus of claim 1 in which said motivating element is provided with a flexible linear device movable around the tank circumference and which drives said motivating element along said circumferential guide.

4. The apparatus of claim 1 in which said motivating element is provided with an articulated linear device movable around the tank circumference and which drives said motivating element along said circumferential guide.

5. The apparatus of claim 1 in which the sludge scraping device is composed of chain and cable, and in which chain substantially forms the sludge collecting portion of the device, whereas the flexible connection substantially consists of cable.

6. The apparatus of claim 1 in which the sludge scraping device has chain loops.

7. The apparatus of claim 1 in which the sludge scraping device has loops and means for maintaining the loops in expanded position.

8. The apparatus of claim 1 in which the sludge scraping device has loops and means for preventing entanglement of the loops.

9. The apparatus of claim 1 in which the sludge scraping device has loops composed of chain and wire rope.

10. Sedimentation apparatus comprising a tank for collecting solids settling from suspension having a discharge outlet, raking means for sweeping settled solids to said discharge outlet including a plurality of rigid arms pivotally supported from the bottom of said tank, a plurality of wheeled travelling elements progressing around said tank above the liquid level thereof, and a connection between each of said travelling elements and said arms whereby motion of said elements is imparted to said arms.

11. Apparatus according to claim 10 in which the connections are flexible.

12. Apparatus according to claim 10 in which the arms are involute.

13. The apparatus of claim 1 in which the sludge scraping device includes rigid members presenting a vertical pushing face to the sludge.

14. The apparatus of claim 1 with the addition of a sludge outlet located off-center of the tank bottom, and means for localizing the middle part of the sludge dragging device with respect to said outlets.

15. The apparatus of claim 1 in which the lateral pull of the drag-member is balanced by a weight-structure suspended from said circumferential rigid guide, whereby the drag-member engages upon a point of said weight structure intermediate its point of suspension and its center of gravity.

16. The apparatus of claim 1, in which the sludge scraping device comprises a curved sludge collecting element which is rotatable about a pivot upon the tank bottom and connected with said travelling motivating element by said flexible connection, which collecting element is effective by virtue of its curvature to produce a maximum accumulation of sludge at a point located off the axis of rotation, and also characterized by a sludge outlet located corresponding to said point of maximum sludge accumulation.

17. Apparatus according to claim 1 characterized by the fact that the travelling motivating element comprises a trolley operative upon said circumferential guide and having two individual trucks movable relative to each other, and also characterized by a weight structure counter-balancing the pull from the sludge load and suspended from said trucks, each truck having a supporting connection with the weight structure, one connection being pivotally movable, the other connection being pivotally and longitudinally movable, thus allowing for the variation in chordal distance between the two weight supporting connections when the travelling element progresses along varying curvatures of the tank circumference.

18. Apparatus according to claim 1 for non-circular tanks, characterized by the fact that the travelling motivating element comprises a trolley operative upon said circumferential guide and having two individual four wheel trucks movable relative to each other, and also characterized by a weight structure counter-balancing the pull from the sludge load and suspended from said trucks, each truck having a supporting connection with the weight structure, one connection being pivotally movable, the other connection being pivotally and longitudinally movable, thus allowing for the variation in chordal distance between the two weight supporting connections when the travelling element progresses along varying curvatures of the tank circumference.

19. The apparatus of claim 1 characterized by a plurality of travelling motivating elements spaced from each other along the tank circumference, and in which the sludge scraping device comprises a flexible suspension system extending over the tank and interconnecting said travelling elements, and a system of sludge collecting loops which in turn are suspended substantially from said flexible suspension system.

20. The apparatus of claim 1, in which the sludge scraping device has sludge collecting main loops, and auxiliary loops attached to said main loop in staggered relation thereto.

21. In settling apparatus, a tank having a curved circumferential wall, a bottom for collecting settled sludge, a sludge scraping device for sweeping the tank bottom, a trolley arrangement adapted to operate upon the curved circumference of the tank and above the liquid level therein, flexible connecting means between said trolley arrangement and the sludge scraping device, said trolley arrangement comprising a circumferential rigid guide or trolley rail, a weight structure having a front and a rear end portion and adapted to move along said rail, a pair of truck units operable upon said rail and adapted to support the respective end portions of said weight structure, and also comprising a supporting connection between each truck and the associated portion of the weight structure which permits of pivotal or swivelling movement about a vertical axis of each truck relative to said weight structure, said flexible connecting means attached to said weight structure in a manner to permit the weight to counterbalance the lateral pull thereon from said sludge scraping device, and means for propelling said weight structure along said rail.

22. Apparatus according to claim 21, in which each truck unit comprises a frame and a wheel arrangement therein having a certain wheelbase, effective to give the truck unit inherent directional stability relative to the rail.

23. Apparatus according to claim 21, in which an articulated circumferential linear driving member impels the weight structure, said drive member being directly attached to said weight supporting connections.

24. Apparatus according to claim 21, in which a circumferentially arranged articulated calibrated link chain impels the weight structure, and vertical bolts or suspension members serve to support the weight structure from the respective trucks, whereby each bolt is associated with a link of said chain to establish driving connections between the weight structure and the chain.

25. Apparatus according to claim 21, in which a circumferentially arranged articulated calibrated link chain impels the weight structure, and vertical bolts or suspension members serve to support the weight structure from the respective trucks, whereby each vertical bolt penetrates a horizontal link of said chain, and the distance between the bolts corresponds to a multiple of the length of a link of said calibrated chain.

26. In sedimentation apparatus, in combination; a settling tank having a bottom and extending upwardly therefrom a boundary wall equipped to furnish a track along the upper portions thereof, which tank is constructed to receive and hold liquids containing suspended solids while undergoing sedimentation, is provided with a solids discharge outlet leading from the lower interior portion of the tank, and is provided with an effluent outlet; an operating mechanism; a movable carrier having a track engaging member movable along the track, sludge removing means in the tank to travel over the tank bottom and operable to move settled solids from diverse sections of the bottom to said solids discharge outlet, means for moving the said sludge removing means as a result of the movement of said carrier; which said operating mechanism comprises a flexible member which is disposed along the general contour of said boundary wall and which is adjacent thereto and which constitutes one main mechanical element of said operating mechanism, a motor which constitutes another main mechanical element of said operating mechanism, power transmission means driven by the motor and engaging said flexible member for setting up relative movement between the motor and the flexible member, one of said main mechanical elements occupying a non-traveling position in respect to the tank while the other of said main mechanical elements moves as the motor operates, and a connection between said movable carrier and the main mechanical element which moves as the motor operates.

NELS B. LUND.